(12) United States Patent
Filippone

(10) Patent No.: US 9,786,396 B2
(45) Date of Patent: Oct. 10, 2017

(54) DECAY HEAT CONVERSION TO ELECTRICITY AND RELATED METHODS

(76) Inventor: Claudio Filippone, College Park, MD (US)

(*) Notice: Subject to any disclaimer, the term of this patent is extended or adjusted under 35 U.S.C. 154(b) by 292 days.

(21) Appl. No.: 13/488,437

(22) Filed: Jun. 4, 2012

(65) Prior Publication Data
US 2012/0328068 A1 Dec. 27, 2012

Related U.S. Application Data

(60) Provisional application No. 61/457,791, filed on Jun. 3, 2011.

(51) Int. Cl.
G21C 19/07 (2006.01)
G21D 5/02 (2006.01)

(52) U.S. Cl.
CPC .............. G21C 19/07 (2013.01); G21D 5/02 (2013.01)

(58) Field of Classification Search
CPC ...... G21C 19/07; G21C 15/18; G21C 15/182; G21C 15/185; G21C 15/25; G21D 5/02; G21D 5/06; G21D 7/00
USPC ........................................ 376/298, 299, 272
See application file for complete search history.

(56) References Cited

U.S. PATENT DOCUMENTS

| | | | |
|---|---|---|---|
| 3,073,961 A * | 1/1963 | Nachbar .................... | G21F 5/10 250/506.1 |
| 3,911,684 A * | 10/1975 | Busey ...................... | G21H 1/00 122/32 |
| 4,643,871 A | 2/1987 | Fajeau | |
| 5,006,303 A | 4/1991 | Rowlands | |
| 5,771,265 A * | 6/1998 | Montazer ................ | F03G 6/045 376/272 |
| 6,183,243 B1 * | 2/2001 | Snyder .................... | G21F 5/005 250/506.1 |
| 6,252,923 B1 * | 6/2001 | Iacovino et al. ............. | 376/272 |
| 2002/0154725 A1 | 10/2002 | Hayman, III | |
| 2003/0179844 A1 * | 9/2003 | Filippone ...................... | 376/208 |
| 2008/0095295 A1 * | 4/2008 | Fuls .......................... | G21F 5/10 376/272 |
| 2011/0286567 A1 * | 11/2011 | Singh ..................... | G21C 19/07 376/272 |
| 2012/0250813 A1 * | 10/2012 | Lloyd .................... | G21C 19/07 376/298 |
| 2012/0294737 A1 * | 11/2012 | Singh ........................ | F28B 1/06 417/410.1 |

FOREIGN PATENT DOCUMENTS

KR 10-20080004714 A 1/2008

OTHER PUBLICATIONS

Extended European Search Report dated Dec. 5, 2014, European Application No. 12793418.0, pp. 1-6.

* cited by examiner

Primary Examiner — Jack W Keith
Assistant Examiner — Sharon M Davis

(57) ABSTRACT

Various embodiments of a decay heat conversion to electricity system and related methods are disclosed. According to one exemplary embodiment, a decay heat conversion to electricity system may include a spent fuel rack configured to pressurize spent fuel bundles to obtain superheated vapor to drive a turbine-driven pump and fast alternator all submerged with the spent fuel rack and positioned at the bottom of the spent fuel pool for conversion of electricity distributed outside of the spent fuel pool via cables without impairing spent fuel pool operations.

12 Claims, 3 Drawing Sheets

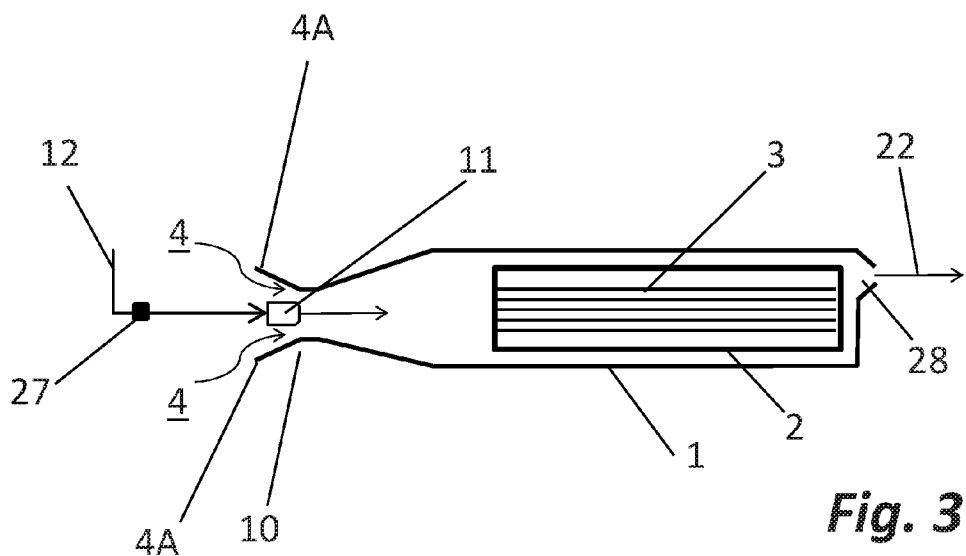
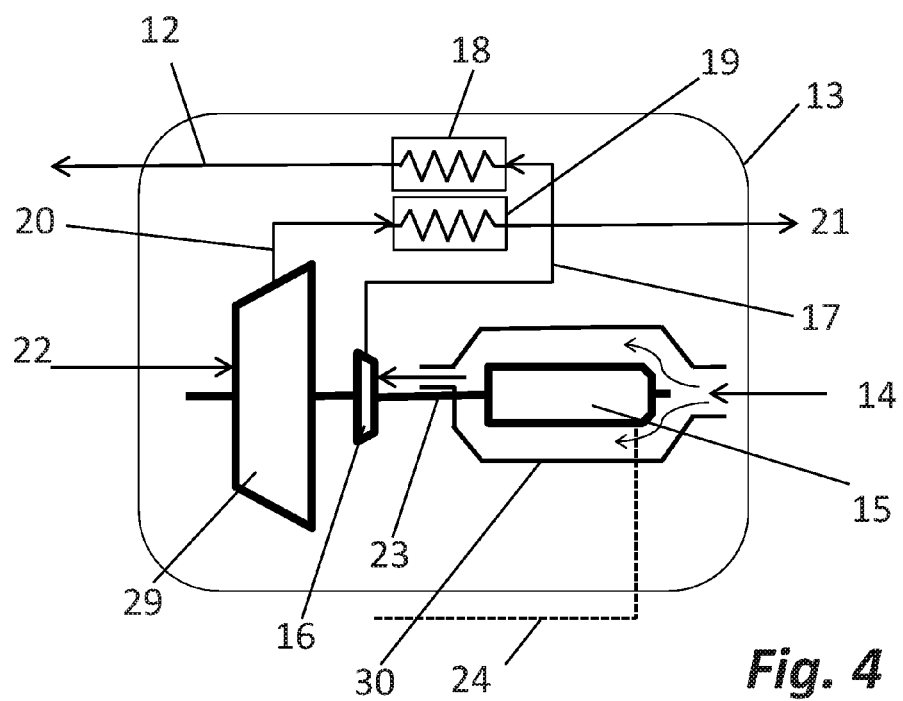

DECAY HEAT CONVERSION TO ELECTRICITY AND RELATED METHODS

This application claims the benefit of priority under 35 U.S.C. §119(e) of U.S. Provisional Application No. 61/457,791, filed Jun. 3, 2011, which is incorporated herein by reference in its entirety.

FIELD OF THE INVENTION

Various embodiments of the present disclosure generally relate to decay heat conversion to electricity and related methods. More specifically, particular embodiments of the present disclosure relate to decay heat conversion to electricity systems and methods for use in, for example, a nuclear reactor.

DESCRIPTION OF RELATED ART

Nuclear reactors typically rely on active mechanisms for removing decay heat generated from nuclear spent fuel. Decay heat is an unavoidable byproduct of nuclear fission energy, which amounts to approximately 6.5% of the nominal core power at the time of shutdown. Although decay heat is reduced to approximately 0.2% after about a week following a shutdown, decay heat continues to be released from nuclear spent fuel and may pose a significant risk if a proper and continuous cooling mechanism is not provided during shutdown and/or storage in spent or storage fuel pools.

In general, a spent fuel pool is a reinforced concrete structure lined with steel plates and filled with water. A spent fuel pool is primarily designed to store spent nuclear fuel while providing continuous cooling to the fuel to ensure that the temperature of the fuel does not increase beyond safety margins. For example, spent nuclear fuel can be positioned at the bottom of the pool, where a large volume of water in the pool is actively circulated through one or more heat exchangers. These heat exchangers operate through activation of one or more electric pumps and thermally communicate with a so-called Ultimate Heat Sink (UHS), normally represented by a large body of water (e.g., river, lake, artificial pond, ocean, etc.).

The United States Nuclear Regulatory Commission (NRC) requires all nuclear power plants operating in the United States to maintain emergency systems that can remove thermal energy from vital plant systems in the event of a design-basis, worst-case accident. The emergency systems must operate independently of any external source of electricity for an extended period of time and include emergency generators to provide emergency onsite electric power. The emergency systems also include containment structures and suppression pools capable of receiving and suppressing the thermal energy that could be released from the reactor core and spent fuel pool by transferring this thermal energy to an UHS.

Therefore, each nuclear power plant must have an UHS capable of removing thermal heat necessary to mitigate a worst-case accident. During the Fukushima Daiichi 2011 accident, however, the UHS of the plant became inaccessible due to seismic- and flooding-induced failure of emergency equipment, which were designed to provide onsite electricity for actively enabling coolant circulation via electric pumps between the heat-generating plant components and the UHS. This failure of emergency equipment prevented adequate thermal exchange between plant equipment and the UHS.

Further, if the structure of an UHS becomes damaged, for example, due to earthquake or flooding, restoring access to or providing a secondary source of electric power alone may not be sufficient to adequately cool the plant equipments. Ensuring that nuclear reactor cooling equipment remains functioning and adequately exchanging thermal energy with an UHS during an accident is a key to the safety of plant personnel and the general public.

SUMMARY

Accordingly, there is a need for developing a decay heat conversion into electricity system and related methods as the conversion of decay heat energy into electricity provides a mechanism to lower the thermal loading on the cooling systems of the spent fuel pool, while providing an alternate source of electric power independently of the power plant emergency systems dedicated to provide electric power. This represents a safety enhancement for the nuclear power plant as electric power obtained from decay heat energy conversion remains available as long as decay heat energy is being produced and independently of the availability of on-site or off-site electric power sources. The decay heat to electricity conversion system can be retrofitted by substituting nuclear fuel storage racks normally utilized to store spent fuel within the spent fuel pool with fuel racks able to be pressurized.

Therefore, various exemplary embodiments of the present disclosure may provide systems and methods for converting decay heat from spent fuel stored within spent fuel pools into electricity that can be utilized as an additional emergency electric power source during power plant off-normal conditions while providing sellable electricity during power plant normal operations with decreased thermal loading on the spent fuel pool cooling equipment.

To attain the advantages and in accordance with the purpose of the invention, as embodied and broadly described herein, one exemplary aspect of the present disclosure may provide a decay heat conversion to electricity system. The system may include a first heat exchanger formed by a fuel rack configured to be pressurized while containing spent nuclear fuel bundles providing a heat transfer containment structure wherein spent fuel pool cooling fluid (i.e. water) may be pressurized. As this fluid flows through the spent fuel bundles it heats up and changes its thermodynamic state into superheated vapor. The super heated vapor then exits the heat transfer containment structure and expands through a turbine-pump-generator system assembled and flanged to the top portions of the fuel rack. The rotary components of the turbine, the pump and the electric alternator are all mechanically coupled to the same shaft and contained within an integral generator unit operating submerged in the spent fuel pool. A portion of the turbine torque produced while converting decay heat energy contained in the superheated vapor is converted into electricity by a fast compact electric alternator/generator. The remaining mechanical torque is converted into pumping power. As colder spent fuel pool fluid enters the suction of the pump it is pressurized into the nozzle of a jet pump positioned at the bottom of the fuel rack. As the fluid exits the nozzle at high pressure and velocity it ensures pressurization so as to allow a higher superheating degree of the fluid while exchanging thermal energy with the fuel bundle. After expanding through the turbine the superheated fluid may condense by venting and mixing with the cooler spent fuel pool fluid.

According to another exemplary aspect, the spent fuel pool fluid may be re-heated prior to inletting the nozzle of the jet pump. Reheating may be achieved by means of a second integral heat exchanger which may include a main body surrounding the rotary components forming the turbine expander, the pump and the rotor components of the fast electric alternator, and defining an inlet, an outlet, and a flow passageway connecting between the inlet and outlet. The flow passageway may be configured to recover thermal energy from the vapors exhausting the discharge side of the turbine prior to venting and condensing into the spent fuel pool. The compact fast alternator is cooled by the fluid inletting the suction of the pump through cooling channels. The jet pump is formed by an assembly housing the fuel assembly drive and the nozzle so that it serves the dual function of providing a guide and support for the fuel bundle to be positioned through the spent fuel rack while providing hydraulic connections between the nozzle and the pump, and electric connections between the alternator assembly, or generator unit, at the top of the spent fuel rack. The electric connections provided by the fuel assembly drive allows for distribution of electricity outside of the spent fuel pool structure from the bottom and along the spent fuel perimeter without impairing spent fuel pool operations.

In some exemplary aspects, a decay heat conversion to electricity system may include a dedicated generator unit designed to convert decay heat energy from each single spent fuel bundle. Other exemplary aspects of a decay heat conversion to electricity system may include a single generator unit operating on the superheated fluid output provided by multiple spent fuel bundles.

Accordingly to another exemplary aspect, a method of converting decay heat to electricity from spent fuel stored in a spent fuel pool may be provided. The method may include converting decay heat from one or multiple spent fuel bundles to a fluid to change its thermodynamic state from sub-cooled liquid to superheated vapor via a first heat exchanger formed by a heat transfer containment, allowing the superheated vapor to expand into a turbine-driven generator-pump system, and converting the energy of the superheated vapor into mechanical and electrical energy while recovering the heat energy of the vapor exiting the turbine discharge by means of a second heat exchanger configured to recover thermal energy form the vapor exiting the discharge of the turbine prior to this fluid undergo condensation and mixing with the spent fuel pool fluid.

Additional objects and advantages of the invention will be set forth in part in the description which follows, and in part will be obvious from the description, or may be learned by practice the invention. The objects and advantages of the invention will be realized and attained by means of the elements and combinations particularly pointed out in the appended claims.

It is to be understood that both the foregoing general description and the following detailed description are exemplary and exemplary only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 3 is a schematic illustration of the jet pump configuration providing high-pressure fluid at the inlet of the heat transfer containment structure housing the fuel bundle for conversion into superheated vapor.

FIG. 4 is a schematic illustration of the integral generator unit housing a turbine-driven generator, pump and whose housing forms an integral recuperator heat exchanger according to another exemplary embodiment of the present disclosure.

DESCRIPTION OF THE EXEMPLARY EMBODIMENTS

Reference will now be made in detail to the exemplary embodiments of the invention, examples of which are illustrated in the accompanying drawings. Wherever possible, the same reference numbers or letters will be used throughout the drawings to refer to the same or like parts.

Figure 1:
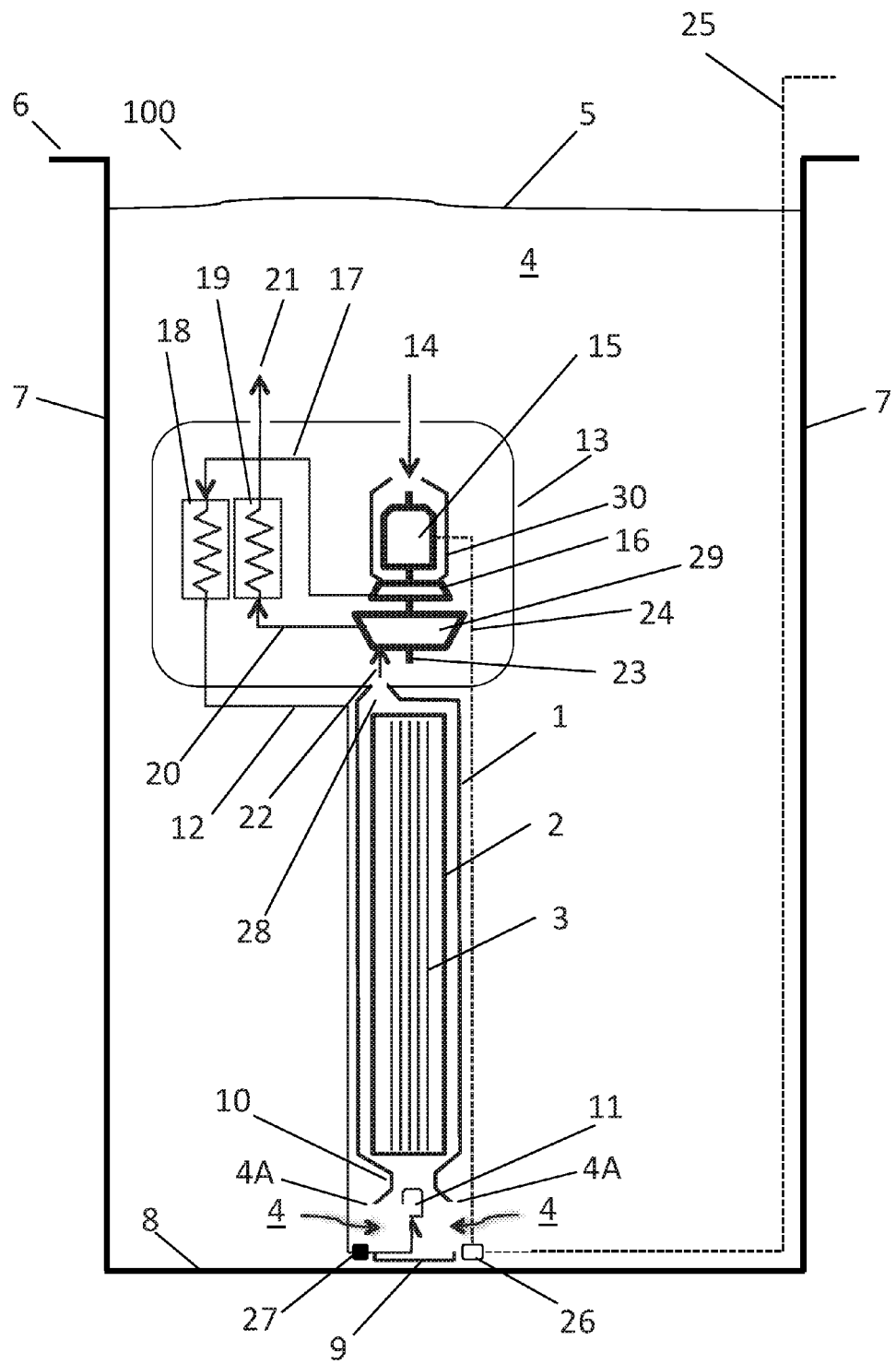
FIG. 1 is a schematic illustration of a decay heat conversion to electricity system according to one exemplary embodiment of the present disclosure.

FIG. 1 illustrates a decay heat conversion to electricity system 100 according to one exemplary embodiment of the present disclosure. System 100 may include a fuel rack 1 configured to allow pressurization of spent fuel pool fluid 4 once pressurized through jet pump 10. Fuel rack 1 may house one or multiple fuel bundles 2 which contain multiple spent fuel rods 3 producing thermal energy as a result of natural decay heat. The fuel rack 1 may be structured to hold one or multiple fuel bundles 2 and is provided with a fuel assembly drive 9 which supports the weight of the fuel rack 1. Fuel assembly drive 9 provides hydraulic inlets for spent fuel pool fluid 4 to inlet at the bottom of the spent fuel pool. Spent fuel pool fluid 4 may be water. Water 4 can freely inlet the bottom of the fuel assembly drive through inlets 4A and naturally flow through the fuel bundle or bundles for assemblies configured for multiple fuel bundles. Water 4 may be pressurized inside the fuel bundle 2 as a result of inletting high-pressure high-velocity water through nozzle 11 through high-pressure hydraulic line 12. As water 4 is pressurized and exchanges thermal energy with the fuel rods 3 inside the fuel rack 1 it increases its energy content until it changes thermodynamic state into superheated vapor at outlet 28. As superheated vapor exits the fuel rack 1, it expands through turbine 29 converting decay thermal energy transferred to the superheated vapor into mechanical energy (i.e. torque). Turbine 29 is mechanically coupled via shaft 23 to a pump impeller 16 and to a fast RpM electric alternator 15. As superheated vapor expands and loses energy via conversion into mechanical energy through turbine 29 it exits the turbine at its discharge 20 and enters the recuperator heat exchanger channels 19 for thermal exchange with the pressurized water 4 at the discharge of pump impeller 16 via heat exchanger channels 18. Pressurized water 4 heated by thermal exchange between channels 19 and 18 is then pumped at high pressure into nozzle 11 forming a jet pump 10 as shown in FIG. 1, 2 and in the more detailed schematic of FIG. 3. Overall, cooler water 4 enters the suction of pump 16 via inlet 14 while flowing through cooling channels inside generator housing 30 designed to cool the fast electric generator 15 of the generator unit 13, and exits pump 16 through discharge line 17 at higher pressure to be ejected at high pressure and velocity at nozzle 11 via pressure line 12 through sealed hydraulic connector 27 provided with fuel assembly drive 9. The electric alternator 15 produced electric energy is distributed via insulated electrical connection 24 to the fuel assembly drive 9 through a sealed electrical connector 26 which allows for electric distribution outside of the spent fuel pool through insulated electrical line 25 without perforation of the spent fuel pool liner 7. The insulated electrical line 25 may be configured to provide electrical power distribution above the spent fuel pool surface 5 at electrically insulated locations that may be placed by the spent fuel pool liner top edges 6.

Figure 2:
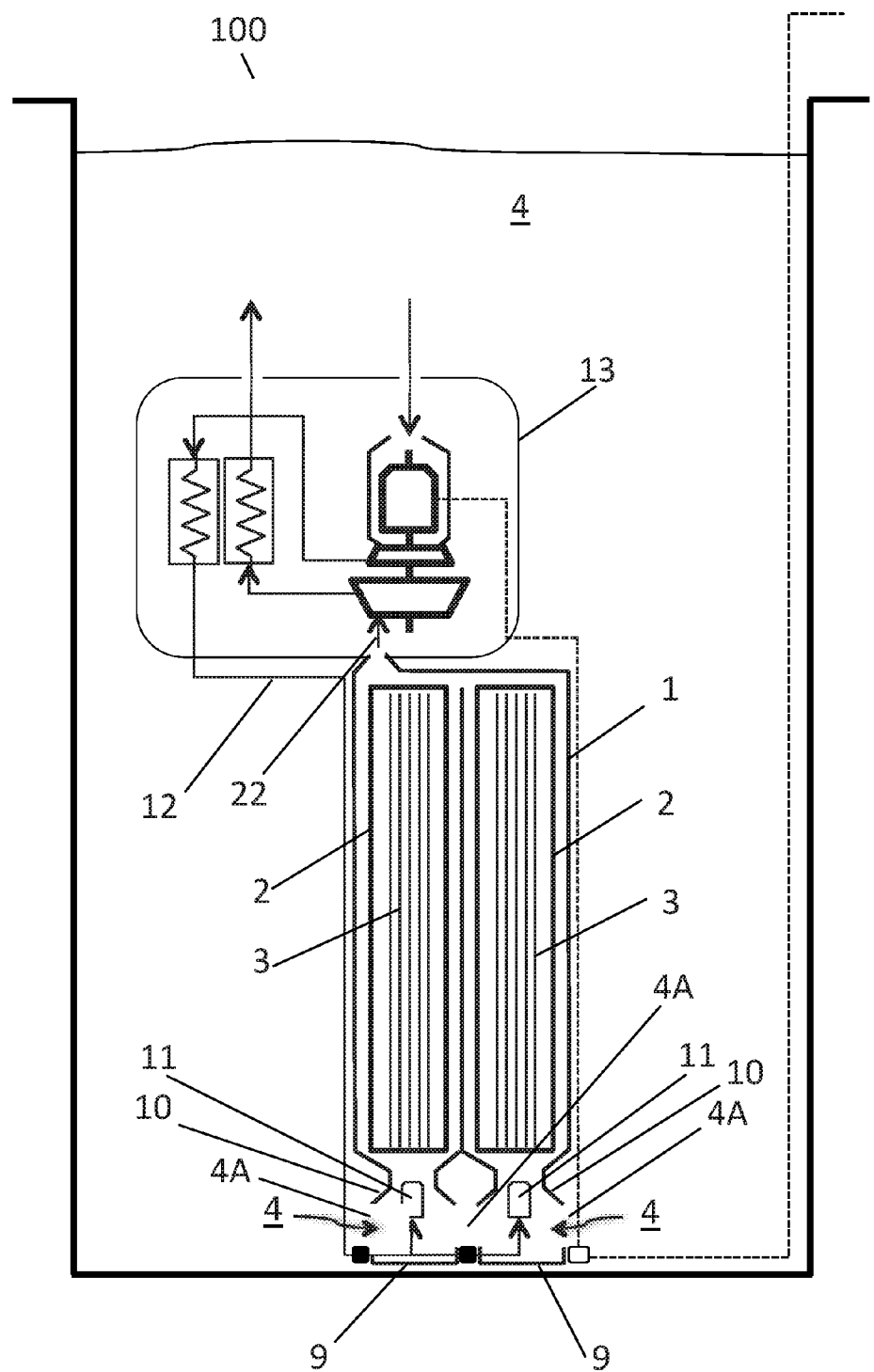
FIG. 2 is a schematic illustration of a decay heat conversion to electricity system wherein a single generator unit may be driven by the superheated vapor energy obtained by heat transfer with multiple fuel bundles contained in one or multiple spent fuel racks, according to one exemplary embodiment.

FIG. 2 is a schematic illustration of a decay heat conversion to electricity system 100 wherein a single generator unit 13 may be driven by the superheated vapor energy 22 obtained by heat transfer with multiple fuel bundles contained in one or multiple spent fuel racks 1, according to one exemplary embodiment.

FIG. 3 is a schematic illustration of the jet pump 11 configuration providing high-pressure fluid 4 at the inlet 4A of the heat transfer containment structure 1 housing the fuel bundle 2 for conversion into superheated vapor 22.

FIG. 4 is a schematic illustration of the integral generator unit 13 housing a turbine-driven generator 15, pump 16 and whose housing 13 forms an integral recuperator heat exchanger 18, 19 according to another exemplary embodiment of the present disclosure.

Additional objects and advantages of the invention will be set forth in part in the description provided, and in part will be obvious from the description, or may be learned by practice the invention. The objects and advantages of the invention will be realized and attained by means of the elements and combinations particularly pointed out in the appended claims.

What is claimed is:

1. A submerged spent fuel pool decay heat conversion system comprising:
    a fuel rack configured to receive the spent fuel from a nuclear reactor, the fuel rack comprising:
        an inlet through which a spent fuel pool fluid flows into the fuel rack;
        an outlet through which the spent fuel pool fluid flows out of the fuel rack;
        wherein the spent fuel pool fluid flowing from the inlet to the outlet of the fuel rack is heated by the decay heat from the spent fuel;
    a turbine disposed at the outlet of the fuel rack, the turbine being configured to convert heat energy from the heated spent fuel pool fluid flowing out of the outlet of the fuel rack into mechanical energy, the turbine comprising a discharge through which the spent fuel pool fluid flows back to the spent fuel pool after expansion in the turbine;
    a pump impeller coupled to the turbine via a shaft configured to be driven by the turbine to pressurize the spent fuel pool fluid, the pump impeller comprising:
        a suction inlet through which the spent fuel pool fluid enters from the spent fuel pool; and
        a discharge outlet through which the spent fuel pool fluid exits from the pump impeller; and a discharge line hydraulically connecting between the discharge outlet of the pump impeller and the inlet of the fuel rack, the discharge line configured to deliver the pressurized spent fuel pool fluid to the inlet of the fuel rack.

2. The system of claim 1, further comprising a nozzle connected to the discharge line adjacent to the inlet of the fuel rack to form a jet pump.

3. The system of claim 2, wherein the inlet of the fuel rack comprises a venturi section adjacent to the nozzle.

4. The system of claim 1, further comprising a first heat exchanger channel connected to the discharge of the turbine and configured to exchange heat with the discharge line, wherein the heat from the spent fuel pool fluid exiting the turbine is transferred to the spent fuel pool fluid exiting the pump impeller and flowing through the discharge line.

5. The system of claim 4, wherein the discharge line comprises a second heat exchanger channel configured to exchange heat with the first heat exchanger channel.

6. The system of claim 1, wherein the turbine and the pump impeller are housed in a generator unit.

7. The system of claim 1, further comprising an electric generator coupled to the turbine via the shaft to generate electricity.

8. The system of claim 7, further comprising an electrical connector connecting between the electric generator and an electrical line outside the spent fuel pool.

9. The system of claim 7, further comprising a generator housing at the suction inlet of the pump impeller to cool the electric generator via the spent fuel pool fluid entering the suction inlet.

10. The system of claim 7, wherein the pump impeller is disposed between the electric generator and the turbine.

11. The system of claim 1, wherein the spent fuel pool fluid at the outlet of the fuel rack is in a superheated state.

12. The system of claim 1, further comprising a fuel assembly drive disposed adjacent the fuel rack for supporting the fuel rack.

* * * * *